Figure 1:
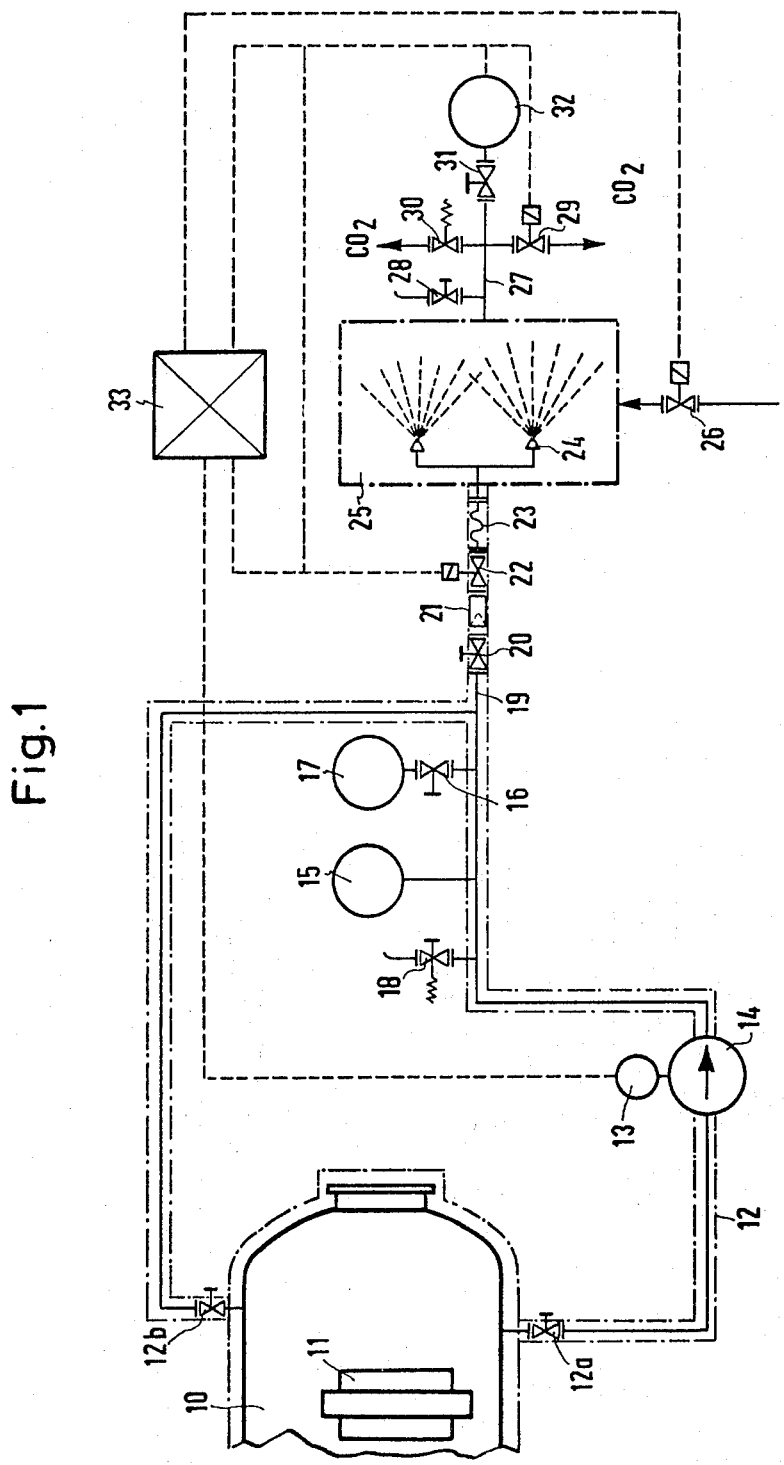

United States Patent [19]

Frank

[11] 3,870,452
[45] Mar. 11, 1975

[54] APPARATUS FOR THE PRODUCTION OF AN ARTICLE FROM THERMOPLASTIC SYNTHETIC PLASTIC, USING BLOWING, INJECTION AND BLOWING OR FOIL BLOWING PROCESS

[76] Inventor: Karl Frank, 8, Lohhohl, Linz/Rhineland, Germany

[22] Filed: Nov. 8, 1973

[21] Appl. No.: 413,892

Related U.S. Application Data

[60] Division of Ser. No. 221,793, Jan. 28, 1972, Pat. No. 3,783,157, which is a continuation of Ser. No. 868,672, Oct. 21, 1969, abandoned.

[30] Foreign Application Priority Data

Oct. 24, 1968 Germany............................ 1805011
Dec. 23, 1968 Germany............................ 1816771
May 22, 1969 Germany............................ 1926275

[52] U.S. Cl.................. 425/387 B, 425/Dig. 204, 425/Dig. 208, 62/386, 105/81
[51] Int. Cl........................................... B29d 23/03
[58] Field of Search......... 425/387 B, 326 B, 324 B, 425/DIG. 208, DIG. 204, DIG. 203; 264/98, 97, 99, 94, 96, 29, 23, 27, 28; 62/55, 45, 386

[56] References Cited
UNITED STATES PATENTS

| 2,348,738 | 5/1944 | Hofmann | 264/237 X |
| 3,018,016 | 1/1962 | Hnilicka | 62/DIG. 13 |
| 3,065,501 | 11/1962 | Gasmire | 425/326 B X |
| 3,287,762 | 11/1966 | Scott et al. | 425/326 B |
| 3,488,801 | 1/1970 | Havely | 264/94 X |
| 3,505,442 | 4/1970 | Culpepper | 425/DIG. 204 |
| 3,512,581 | 9/1970 | Lawton | 62/45 X |
| 3,520,020 | 7/1970 | Williams et al. | 264/94 X |
| 3,661,483 | 5/1972 | Bose | 425/326 B |

*Primary Examiner*—Francis S. Husar
*Assistant Examiner*—David B. Smith
*Attorney, Agent, or Firm*—Burns, Doane, Swecker & Mathis

[57] ABSTRACT

An improved apparatus for the production of flow molded shaped articles from a synthetic thermoplastic polymeric material is provided. The hollow shaped article following blowing is cooled through the introduction of a liquified coolant (e.g., carbon dioxide) in the form of liquid droplets in the absence of coolant expansion which contacts the internal surface of the hollow article while in liquified form. Contrary to the prior art the pressure within the hollow shaped article is maintained above that of the triple point of the coolant throughout the entire cooling operation. Disadvantages of the prior art, such as uneven cooling resulting from a phase change in the coolant, are effectively eliminated.

21 Claims, 2 Drawing Figures

APPARATUS FOR THE PRODUCTION OF AN ARTICLE FROM THERMOPLASTIC SYNTHETIC PLASTIC, USING BLOWING, INJECTION AND BLOWING OR FOIL BLOWING PROCESS

This is a division of application Ser. No. 221,793, filed Jan. 28, 1972, now U.S. Pat. No. 3,783,157, which is a continuation of application Ser. No. 868,672, filed Oct. 21, 1969, now abandoned.

The invention relates to an apparatus for the production of an article from thermoplastic synthetic plastics, using the blowing, injection and blowing or foil-blowing process, from a tube or lump, in which the tube or the lump is expanded in a blowing mold by a gaseous medium which is under pressure and then is cooled by a medium which is supplied in liquid state, more especially liquid carbon dioxide.

Using this producing method, the cooling medium which has a low temperature is conducted from a coolant source to a neck-forming pin and through the passage of the latter into the cavity of the previously expanded article. The invention is now based on the discovery that the cooling efficiency thereby obtained in the cooling medium cannot be fully utilized for cooling the expanded article. The reason for this is that, caused by the shape of the outlet nozzle for the cooling medium on the neck-forming pin, the said medium already expands before issuing from the nozzle and already loses some of its cooling effect on the said nozzle. Because of this premature expansion of the cooling medium, the latter, especially when using $CO_2$, changes partially into the solid state ($CO_2$ snow) and the gaseous state. As a consequence, the cooling effect is greatly reduced, and only uneven cooling of the different parts of the article to be cooled is achieved and, caused by the coolant snow being blown in, irregularities in the surface of the article to be cooled are formed.

Consequently, it is the object of the invention to provide an apparatus by which it is possible for the cooling capacity contained in the liquid cooling medium, advantageously in liquid carbon dioxide, to be fully utilised successfully for cooling the internal volume of the expanded article which is to be cooled.

Another object of the invention is to provide an apparatus ensuring that the cooling proceeds quickly, economically and with certainty, but at the same time the cost of construction remains as low as possible.

In order to solve these problems, it is now necessary to ensure that the liquid coolant does actually pass with the required low temperature into the mold cavity. In principle, it is of course already known to provide coolant supply pipes with a heat insulation, advantageously a foam based on synthetic plastics, cork or the like, in order in this way to provide a certain heat insulation. However, the problem as set forth is not to be solved by this procedure, since synthetic plastic casings only show a low insulating effect, this being more especially because important losses of cold occur in the region of the hot and frequently additionally heated neck-forming pin or material storage device, which cannot be enclosed with insulating material.

Further, when using liquid carbon dioxide as coolant, there is often the danger of the occurrence of undesirably high pressures which possibly lead to a destruction of the article to be blown or of the mold, due to unavoidable temperature fluctuations of the articles to be blown. The supply and discharge of the coolant must consequently be exactly controlled as a function of time and quantity, and this leads to a considerable expense in construction. An additional factor is that, in many cases, comparatively long supply lines are necessary from the coolant source to the neck-forming pin. Based on this knowledge, the apparatus according to this invention is therefore characterised by a coolant supply from a ring pipe which starts from the coolant source and returns to the latter, said pipe having an incorporated circulating and pressure-increasing pump, and a pipe union which branches off from the ring pipe at a place adjacent the neck-forming pin and opening into a shut-off valve and a flexible pipe conduit leading from the shut-off valve to the neck-forming pin, the entire supply arrangement being heat-insulated and branch unions and also flexible pipes being kept as short as possible, and also by an outlet of coolant, starting from the mold cavity, from an outlet pipe provided with shut-off valves and safety valves. By means of the ring pipe according to the invention, there is obtained the important advantage that the temperature of the coolant can in an extremely simple manner always be maintained at the temperature inside the coolant source until in the immediate vicinity of the neck-forming pin, even when the source has to be arranged a comparatively long distance away. Extraction of cold can thus only occur in the short branch section between the ring pipe and the neck-forming pin, the heat transfer in this short pipe section being almost completely excluded by the insulation according to the invention. By the excess pressure which is produced by the pump of the ring pipe, it is ensured that the coolant always remains above the trip point and over-critical and thus always reaches the walls to be cooled in a liquid form. Finally, any occurrence of excess pressures in the mold cavity are avoided by the outlet pipe with the shutoff and safety valves, thus protecting the article to be charged and the mold from any damage.

The shut-off valve of the coolant supply, situated between the branch union and flexible pipe conduit or before the neck-forming pin, and the shut-off valve disposed in the coolant outlet pipe, are control valves, whereby an exact control of the cooling operation is possible.

According to a further development of the invention, a pressure-dependent switch means is arranged in the coolant outlet pipe, said means forming a safety shut-off valve arrangement in conjunction with the control shut-off valve of the coolant supply and the control shut-off valve of the coolant outlet. The result hereby obtained is that not only is an outlet valve opened when there is a sudden rise in pressure in the mold cavity, but also the inlet valve is closed, and this represents a further increase in safety.

Figure 2:
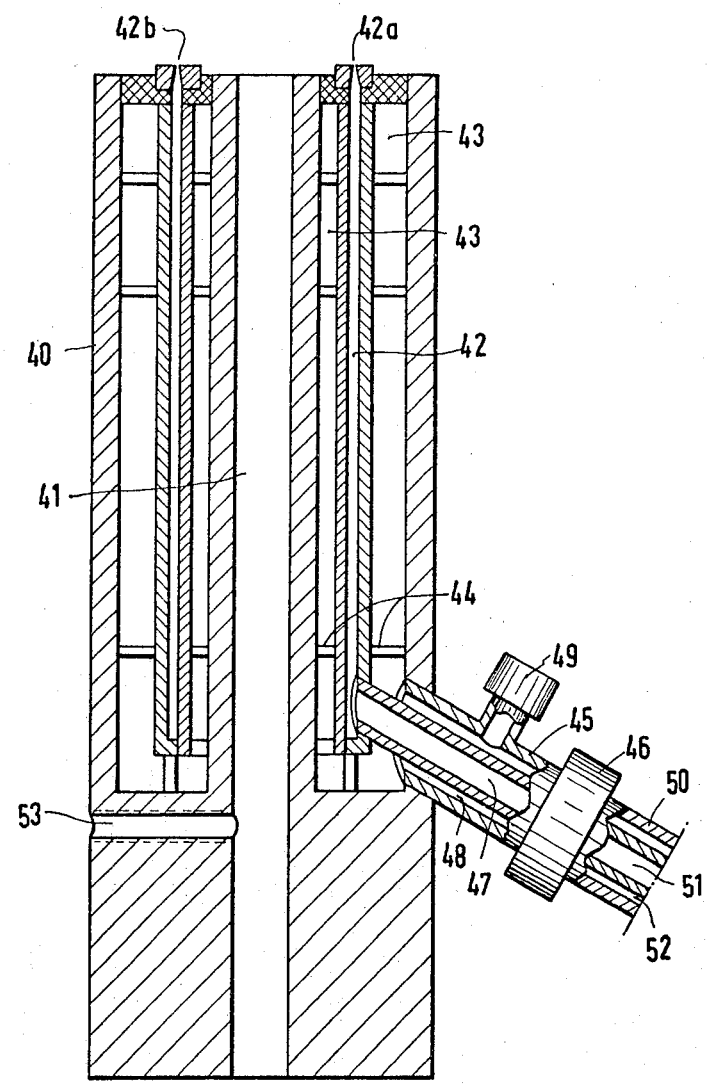

Further features, details and advantages of the invention are apparent from the specification, the drawing and the claims. Constructional forms of the invention are shown by way of example in the drawing, wherein:

FIG. 1 is a diagrammatic view of those parts of the apparatus which are essential for the invention, and FIG. 2 is a longitudinal section through a neck-forming pin according to the invention and a part of the connected supply line for the coolant.

According to FIG. 1, the apparatus comprises an insulated coolant tank 10, in which is arranged a refrigerating machine 11. Extending from the bottom of the tank 10 is a likewise insulated pipe 12, which is constructed as a ring pipe and, as shown in the drawing, returns to the tank 10. The ring pipe 12 can be shut off by valves 12a and 12b. Installed in the pipe 12 is a circulating and pressure-raising pump 14 which is driven by a motor 13. The temperature of the pipe 12 can be determined by the thermometer 15 and the pressure in the pipe can be determined by the pressure gauge 17 provided with a shut-off valve 16. The pipe 12 is protected by a spring-loaded valve 18.

Extending from the pipe 12 is a branch union 19, in which are arranged a valve 20, a filter 21 and a control valve 22. A vacuum-insulated flexible tube 23 leads from the control valve 22 to the neck-forming pin, of which, however, only the nozzles 24 are shown on the drawing, these nozzles injecting the coolant into the mould cavity 25.

Opening into the mold cavity 25 is the supply pipe for the blowing medium, namely air or gas, a control valve 26 being mounted in this supply pipe.

Leading from the mold cavity 25 is an outlet pipe 26 with a handwheel emptying valve 28 and an outlet control valve 29. In addition, a spring-loaded pressure-maintaining and safety valve 30 is connected to the outlet pipe 27, and also a pressure-sensing device 32 which can be shut off by a valve 31.

Indicated by the reference 33 is a switch mechanism which, through control conduits shown in broken lines, controls the motor 13 for the pump 14, the coolant inlet control valve 22, the air inlet control valve 26 and the common outlet control valve 29. From the pressure-sensing device 32., control lines lead to the control valve 22 and 29 and also the switching position 33.

The apparatus operates in the following manner:

In order to make the apparatus ready for operation, the two valves 12a and 12b are opened and the pump-driving motor 13 is started. As a result, liquid carbon dioxide circulates in the direction indicated by the arrow through the ring pipe 12, and at a certain excess pressure, which is higher than the pressure in the coolant tank. The refrigerating machine 11 ensures that the temperature of the carbon dioxide in the tank 10 and thus also in the ring pipe 12 always remains at the required value. The supervision of the temperature and pressure in the ring pipe 12 is effected by the two indicating instruments 15 and 17, which are disposed in the immediate vicinity of the branching position of the union 19. If now the inlet control valve 22 is opened from the switching position 33, liquid carbon dioxide flows through the flexible pipe 23 into the neck-forming pin and is injected by the nozzles 24 thereof into the mold cavity 25. After the article disposed in the mold cavity 25 has cooled, the control valve 22 is again closed and the outlet control valve 29 is opened, so that the now gaseous carbon dioxide and the blowing air originating from the expanding operation are released from the mold cavity, generally into the free atmosphere. If the pressure-sensing device 32 detects during the cooling operation that the rise in pressure in the mold cavity 25 is exceeding a value likewise fixed from the switching position 33, then the pressure-sensing device 32 automatically opens the outlet valve 29 and simultaneously closes the inlet valve 22. An additional safeguard is offered by the spring-loaded safety valve 30, which represents a device protecting against explosion. This valve 30 also represents a pressure-maintaining valve. With the cooling of articles having a considerable wall thickness, such a quantity of coolant is necessary that "spent" coolant must be constantly released, already during the cooling operation. The discharge of the coolant and also of the blowing air which is still in the mold from the expanding operation is effected in such a case through this valve 30, which thus guarantees the maintenance of the required pressure during the entire operation, from the commencement of the expansion until the end of the cooling. Any residues of coolant which still remain in the mold-cavity or in the outlet pipe 27 after the installation has been stopped could be discharged through the valve 28, which is provided with a handwheel and thus can also be operated in the event of failure at the switching position 33.

The injection of the coolant to the mold cavity 25 is effected in known manner after the expansion of the article to be blown by the blowing air or another gas. The inlet of the blowing air takes place through the valve 26 and the outlet thereof, together with the gaseous coolant, through the valve 29. The switching sequences and times of the two inlet valves 22 and 26 and also of the common outlet valve 29 are controlled from the switching position 33, advantageously in the form of a programme switching circuit.

Using the apparatus according to the invention, obviously a very economical cooling operation with high refrigeration capacity is made possible, and also exact control of the times and the duration of the supply of coolant, whereby in addition a maximum degree of safety is provided. Despite these advantages, the apparatus according to the invention is comparatively simple and the cost of construction thereof is small.

The apparatus according to the invention can experience numerous modifications. Thus, it is possible to arrange for the outlet pipe 27 not to open into the free atmosphere through the valves 29 and 30, but to be connected to a recovery arrangement. The "spent" coolant discharged from the outlet pipe 27 can, however, also be used as a protective gas for the hot and plastic unfinished article supplied by the extruder (many thermoplastic plastics are very sensitive in the hot state and more especially are sensitive to corrosion) and/or serve as blowing medium for expanding the unfinished article. Finally, several ring pipes can also be provided with branch unions and flexible pipes each leading to a neck-forming pin, the switch elements of all supply and outlet arrangements then being controlled from the common switching position.

FIG. 2 shows in detail how the insulation on the neck-forming pin can be constructed. The neck-forming pin, 40 shown as a whole in FIG. 2, has a blowing duct 41 extending axially therethrough, which duct is connected to a blowing agent supply arrangement (not shown) and opens into the cavity of the article which is to be expanded and cooled, said article also not being shown. The blowing duct 41 is enclosed with spacing by a duct 42, which represents the coolant duct and also opens at 42a into the cavity of the hollow body. The coolant duct 42 is surrounded over its entire length and on both sides by an annular duct 43, which is closed at both ends and is evacuated. Bars 44 support the coolant duct 42 inside the vacuum duct 43. Fitted into the mouth 42a of the coolant duct 42 is a nozzle 42b, which is constructed as an atomizing nozzle.

Formed laterally on the neck-forming pin is a double-walled pipe union with a coupling member 46. The inner pipe 47 of the union 45 communicates with the coolant duct 42 and the outer pipe 48 with the vacuum duct 43. A branch section 49 starting from the outer pipe 48 serves for the connection of a vacuum pump (not shown).

The neck-forming pin 40 is connected by the coupling 44 to a flexible supply pipe 50, which is only partly shown. The flexible pipe 50 has a double wall, the inner pipe 51 serving as a coolant supply pipe, and the annular chamber 52 disposed between the two pipe walls is evacuated. Indicated at 53 is an outlet duct for the blowing agent and the coolant, said duct starting from the blowing duct 41.

The coolant is thus conducted from the coolant supply through the vacuum-insulated flexible pipe 50 and then through the pipe 47 and the coolant duct 42 up to its outlet opening 42a, where it then extends by means of the nozzle 42b into the cavity of the article to be cooled; by the vacuum installation which extends as far as the outlet end 42a of the coolant, the losses of cold are reduced to a minimum. This applies more especially for the distance through which the coolant travels inside the coolant duct 42, although this duct extends inside a known hot body, namely, the neck-forming pin. Where the coolant which is used is liquid carbon dioxide, it is ensured that this does not vaporize while it is being supplied, but actually reaches the outlet end 42a of the duct in liquid form. The atomizing nozzle 42b guarantees that the coolant acts on the internal wall of the hollow body in the form of ultra-small droplets; large droplets can in fact lead to a "graining" of the wall.

The coolant duct can also consist of a plurality of longitudinal ducts which are parallel to one another, and in this case an atomizing nozzle is fitted into the outlet end of each longitudinal duct. This constructional form of the invention provides the advantage of being able in a particularly favorable manner to take into account the geometry of the cavity of the article in question, this being done by using different nozzles. It is also possible in this way to allow for different cooling requirements, for example, with different wall and base thicknesses of the hollow body to be manufactured. In any case, it is possible by means of the invention, by suitable choice of the number, direction, size and type of the nozzles, to obtain an exact adaption to the actual requirements, by the required admission quantity of coolant and size of coolant droplets being achieved at any place on the inside wall of the article to be cooled.

Valves, couplings and the like which are necessary in the supply pipe for the coolant are likewise to be provided with a vacuum insulation. It is also desirable for the supply cross-sections for the coolant to decrease progressively from the coolant source to the outlet end of the coolant duct, in order in this way further to reduce the danger of a premature evaporation of coolant.

As well as carbon dioxide, liquid air, liquid $NH_3$ or $NO_2$ and also $CF_2Cl_2$ are suitable as coolant, and in the latter case, recovery is expedient, as already indicated in connection with FIG. 1.

It is of essential importance that, during the entire cooling operation, the pressure in the mold cavity is so controlled that the liquid cooling medium, usually liquid carbon dioxide, which issues from the neck-forming pin remains above the triple point.

In other words, the otherwise usual expansion is prevented, so that formation of snow is avoided and the carbon dioxide reaches the surface to be cooled in liquid form and only changes on this surface into the gaseous state. By this means, and by preventing the precipitation of carbon dioxide snow, a maximum cooling effect is achieved, and damage to the surface of the blown parts by uncontrolled occurrence of carbon dioxide snow is avoided.

With the apparatus according to the drawing, atomizing nozzles in a suitable number, with a suitable direction and size can be fitted into the outlet opening of the neck-forming pin. When operating in accordance with the process of the present invention, the inner surface of the expanded article is sprinkled with liquid carbon dioxide for cooling purposes, and in fact according to the sprinkling quantity necessary on each region of the surface to be cooled. However, it is once again to be pointed out that, in accordance with the process of the invention, the said nozzles do not act as expansion nozzles, but merely effect a conversion of pressure into velocity.

I claim:

1. Apparatus for the production of an article from synthetic thermoplastic material comprising:
   a mold having a cavity therein;
   a source of liquid coolant;
   a neck forming pin attached to said mold, said pin being provided with at least one duct which opens into said cavity;
   a ring pipe connected at each end to said coolant source, said ring pipe including a pipe union which branches off therefrom;
   a liquid circulating and pressurizing pump connected with said ring pipe and being operable to circulate and pressurize liquid coolant carried by said ring pipe;
   a first shut-off valve provided in said pipe union;
   a flexible pipe conduit providing fluid communication between said neck forming pin and said first shut-off valve;
   thermal insulation provided for said coolant source, said ring pipe, said pump, said union, said first shut-off valve and said flexible pipe conduit;
   a coolant outlet pipe provided within said mold whereby coolant may be exhausted from said mold cavity;
   an outlet pipe shut-off valve connected with said outlet pipe;
   a pair of safety valves connected with said outlet pipe; and the cross sectional area of said pipe union and said flexible pipe progressively decreasing from said coolant source to said at least one duct.

2. The apparatus according to claim 1 wherein: said coolant source includes a refrigerating machine.

3. Apparatus according to claim 2 wherein: a motor is provided to drive said pump.

4. Apparatus according to claim 3, wherein said ring pipe includes:
   a safety valve which exhausts to atmosphere;
   a thermometer; and
   a pressure sensing device.

5. Apparatus according to claim 4 wherein: said branch union is provided with a second valve and with a filter.

6. Apparatus according to claim 5 wherein: said first shut-off valve is a control valve and is disposed between said branch union and said neck forming pin.

7. Apparatus according to claim 6 wherein:

outlet pipe shut-off valve is a control valve.

8. Apparatus according to claim 7 wherein:
one of said pair of safety valves comprises a spring-loaded pressure-maintaining valve.

9. Apparatus according to claim 8 wherein:
said coolant outlet pipe includes a pressure sensing device which is operatively connected with said first shut-off valve thereby comprising a safety shut-off valve arrangement.

10. Apparatus according to claim 9 wherein:
a common switching position is provided to control said motor, said first shut-off control valve and said outlet pipe shut-off control valve.

11. Apparatus according to claim 10 wherein:
said coolant outlet pipe and said outlet pipe shut-off control valve comprise an outlet for a blowing agent.

12. Apparatus according to claim 11 wherein:
a supply pipe communicates with said mold cavity, such that a blowing agent may be introduced to said mold cavity therethrough; and
a third shut-off valve is provided on said supply pipe, said third shut-off valve adapted to be controlled from said common switching position.

13. Apparatus according to claim 12 wherein:
said coolant outlet communicates with coolant recovery means.

14. Apparatus according to claim 13 wherein:
a plurality of ring pipes are each provided with a branch union which communicates with a neck forming pin and a flexible pipe, said plurality of ring pipes are arranged such that switch elements thereof may be operated from said common switching position.

15. Apparatus according to claim 1 wherein:
said neck forming pin includes a vacuum-insulated duct therethrough, one end of which communicates with said mold cavity; and
a vacuum-insulated supply pipe is connected at one end thereof to said duct and at the second end thereof to said coolant source.

16. Apparatus according to claim 15 wherein:
said neck forming pin includes a second duct, one end of which is in fluid communication with said mold cavity;
a supply pipe is connected at one end thereof to the second end of said second duct; and
a blowing agent source is connected to the second end of said supply pipe.

17. Apparatus according to claim 16 wherein:
atomizing nozzles are provided at said end of said vacuum-insulated duct which communicates with said mold cavity.

18. Apparatus according to claim 17 wherein:
the number, direction, size and type of said nozzles are adapted to the geometry of said mold cavity.

19. Apparatus according to claim 18 wherein:
vacuum insulation is provided for said valves and couplings provided in said coolant supply pipe.

20. Apparatus for the production of an article from synthetic thermoplastic material comprising:
a mold having a cavity therein;
a source of liquid coolant;
a neck forming pin attached to said mold, said pin being provided with at least one duct which opens into said cavity;
a ring pipe connected at each end to said coolant-source, said ring pipe including a pipe union which branches off therefrom:
a pump connected with said ring pipe for circulating and increasing the pressure of liquid coolant carried by said ring pipe;
a first shut-off valve provided in said pipe union;
a flexible pipe conduit providing fluid communication between said neck forming pin and said first shut-off valve;
thermal insulation provided for said coolant source said ring pipe, said pump, said union, said first shut-off valve, and said flexible pipe conduit;
a coolant outlet pipe provided within said mold whereby coolant may be exhausted from said mold cavity;
an outlet pipe shut-off valve connected with said outlet pipe;
a pair of safety valves connected with said outlet pipe;
said neck forming pin including a vacuum-insulated duct therethrough, one end of which communicates with said mold cavity;
a vacuum-insulated supply pipe connected at one end thereof to said duct and at the second end thereof to said coolant source;
said neck forming pin including a second duct one end of which is in fluid communication with said mold cavity;
a supply pipe being connected at one end to the second end of said second duct;
a blowing agent source being connected to the second end of said supply pipe;
atomizing nozzles being provided at said end of said vacuum insulated duct in communication with said mold cavity;
the number, direction, size and type of said nozzles being adapted to the geometry of said mold cavity;
vacuum insulation being provided for said valves and couplings provided in said coolant supply pipe; and
the cross-section of said coolants supply pipe decreases progressively from said coolant source to said end of said vacuum-insulated duct in communication with said mold cavity.

21. Apparatus according to claim 20 wherein:
said coolant is liquid carbon dioxide.

* * * * *